Figure 1:
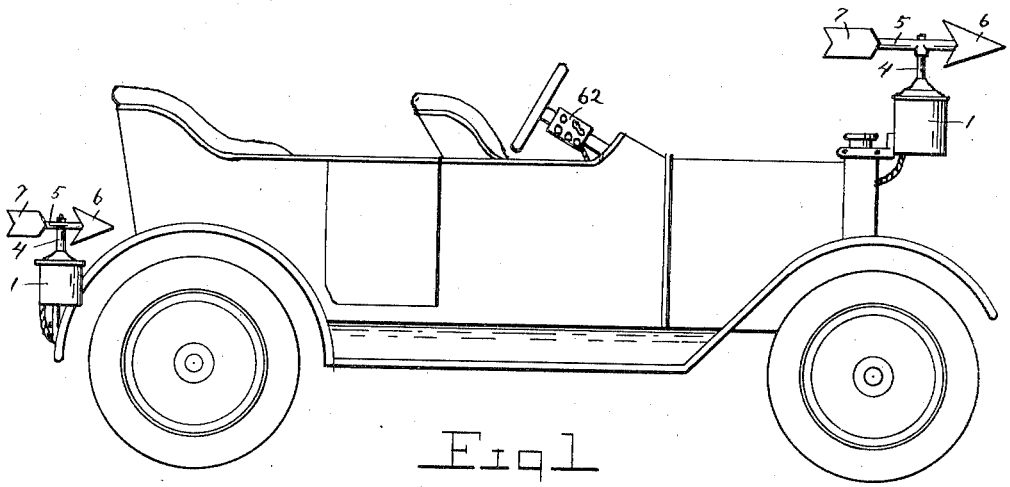

J. M. WITMER.
WARNING SIGNAL.
APPLICATION FILED JUNE 11, 1917.

1,302,618.

Patented May 6, 1919.
3 SHEETS—SHEET 1.

Inventor
John M. Witmer.
Attorney

J. M. WITMER.
WARNING SIGNAL.
APPLICATION FILED JUNE 11, 1917.
1,302,618.
Patented May 6, 1919.
3 SHEETS—SHEET 2.
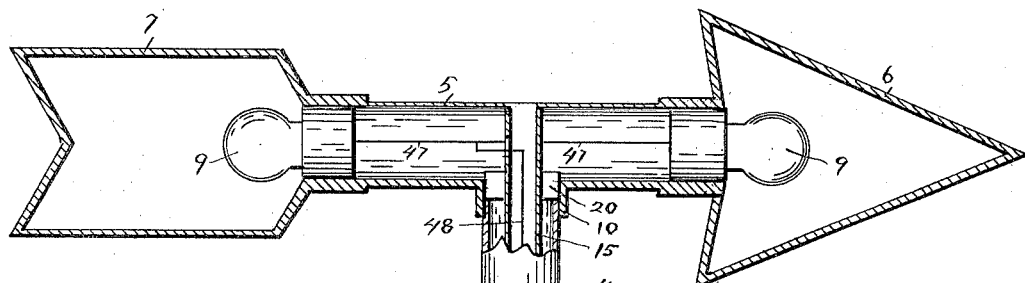
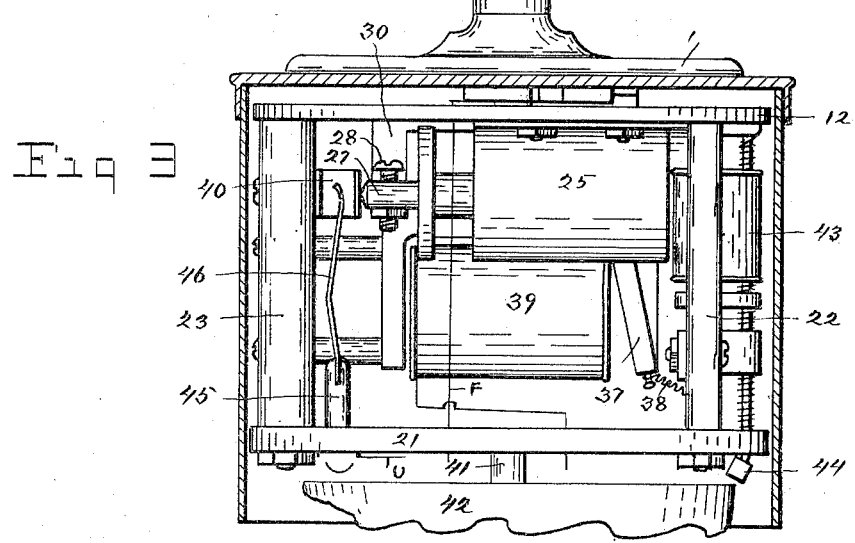
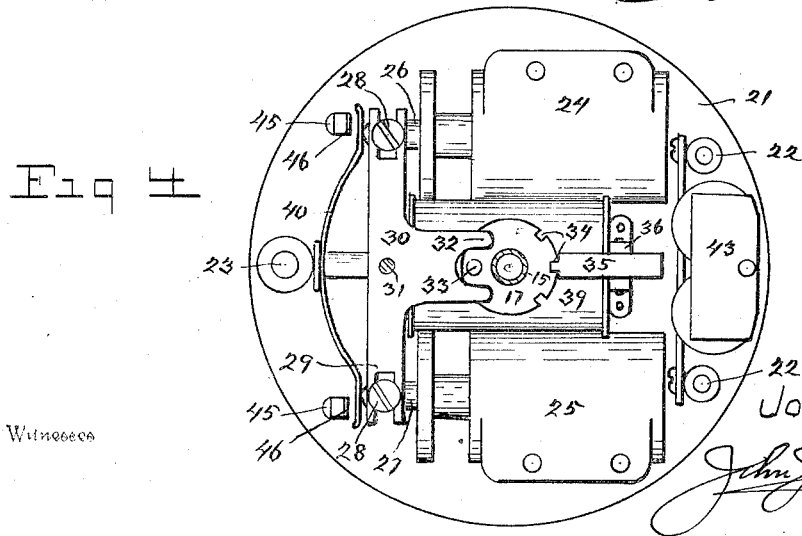

J. M. WITMER.
WARNING SIGNAL.
APPLICATION FILED JUNE 11, 1917.
1,302,618.
Patented May 6, 1919.
3 SHEETS—SHEET 3.
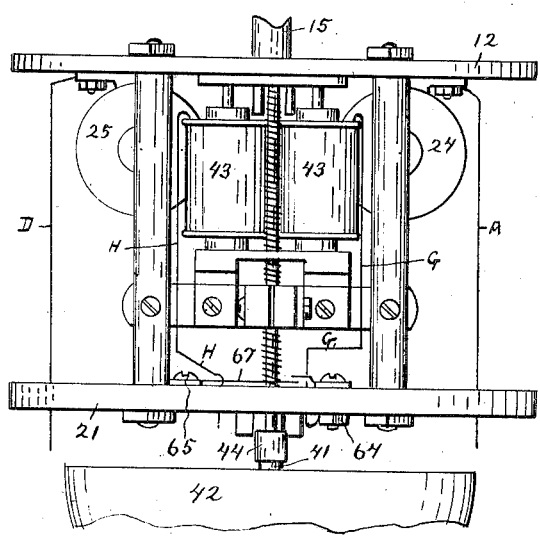
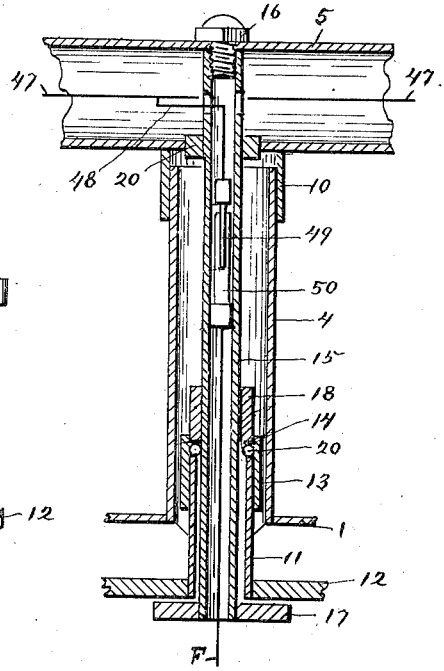
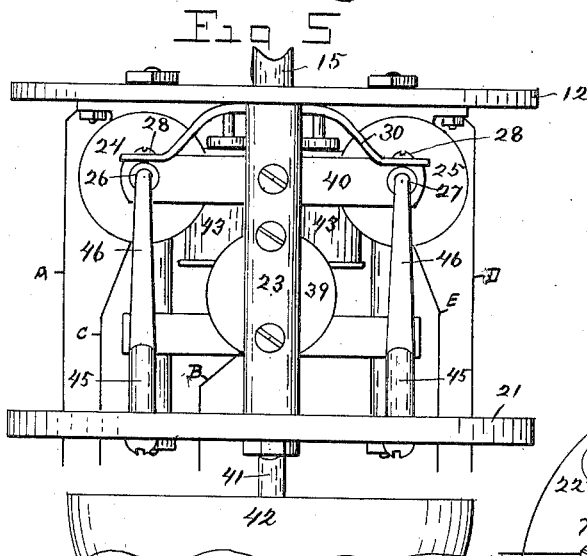
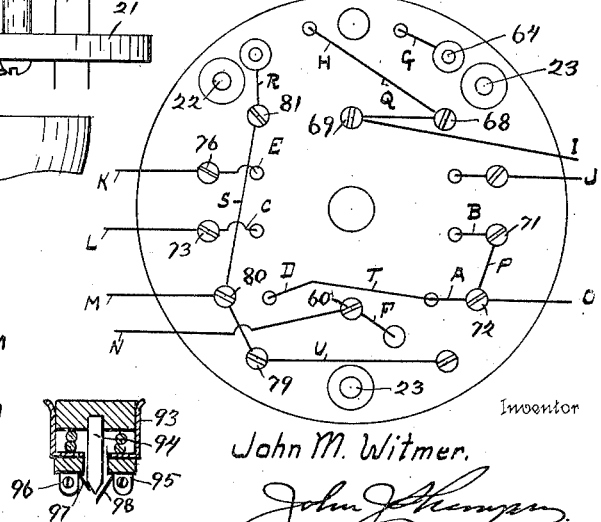
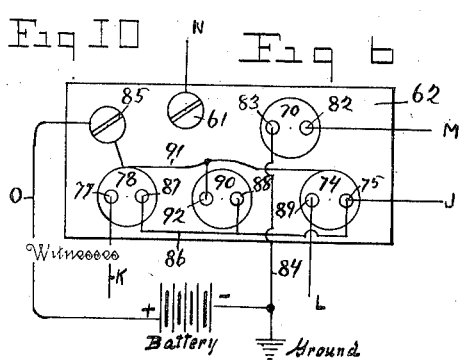
Inventor
John M. Witmer.
Attorney

UNITED STATES PATENT OFFICE.

JOHN M. WITMER, OF LANCASTER, PENNSYLVANIA.

WARNING-SIGNAL.

1,303,618.    Specification of Letters Patent.    Patented May 6, 1919.

Application filed June 11, 1917. Serial No. 174,134.

*To all whom it may concern:*

Be it known that I, JOHN M. WITMER, a citizen of the United States, residing at 132 East Lemon St., in the city of Lancaster, in the county of Lancaster and State of Pennsylvania, have invented certain new and useful Improvements in Warning-Signals, of which the following is a specification, reference being had therein to the accompanying drawing.

This invention relates to a warning signal for vehicles, such as automobiles, and it comprises a device in the form of an arrow, which may be mounted both at the front and rear of the automobile, and operated by electric means which is under the control of the driver.

The object of the invention is to provide a warning signal which will not only warn persons of the approach of the vehicle by the continuous sound of a bell, but which will indicate in which direction the vehicle is about to take, either right or left, and remains so until brought back to a normal position.

Another object is to produce a device of this kind that shall be operated by an electric current furnished by the usual storage battery of the vehicle, and easily controlled by the driver.

A further object is to provide a device of this class that shall be simple, and easily attached to any automobile or other vehicle.

With these and other objects in view my invention consists in certain construction and combination of parts as will hereinafter be fully described and claimed, but it is fully understood that I do not confine myself to the exact design as shown, as slight changes may be made in the construction and arrangement of the several parts without departing from the spirit of the invention.

In the drawings;—

Figure 1. shows a side elevation of an automobile with the device attached at the front and rear thereof.

Figure 2:
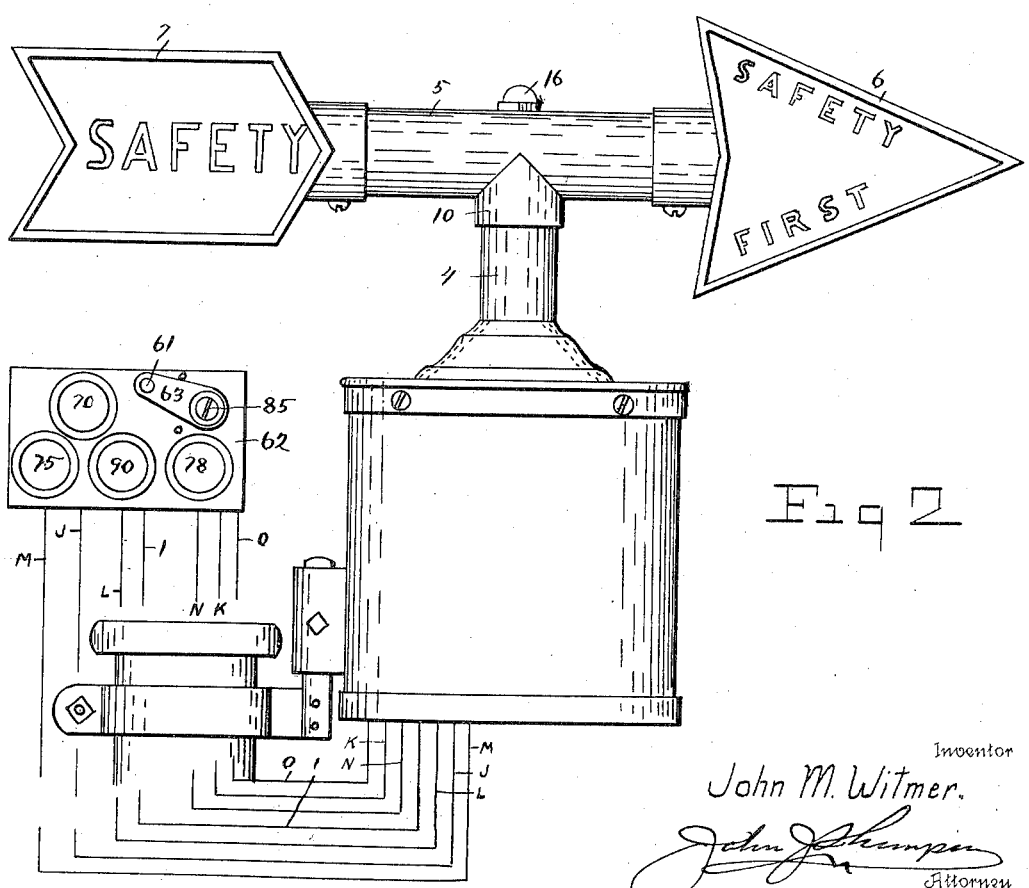

Fig. 2. is a side elevation of the device showing the same attached to the filler pipe of an automobile, and also a top plan view of the operating switch and wiring.

Fig. 3. is a view of the device partly in section.

Fig. 4. is a top plan view of the mechanism with the top plate removed.

Fig. 5. is a front elevation of the working parts with the casing removed.

Fig. 6. is a rear end elevation of the same.

Fig. 7. is a vertical sectional view in enlarged detail of the stem and part of the arrow.

Fig. 8. is a bottom view of the lower plate, showing the electric wiring.

Fig. 9. is an enlarged detail sectional view of the form of push button switch employed.

Fig. 10. is a bottom view of the switch block, showing the wiring of the same.

Referring to the drawings, the device comprises a tubular casing 1, having attaching means 2 for securing the same to the automobile 3.

Extending upward from said casing 1 is a stem 4 upon which is mounted an arrow 5; said arrow 5 being formed with a tubular body and having a head 6 and a tail 7, both formed with semi-transparent sides having suitable lettering placed thereon, and containing electric lighting bulbs 9.

Describing the mechanical construction first, the casing 1 has secured to the upper part the lower end of the tubular stem 4; while the arrow body 5 has depending therefrom a tubular socket 10 which is mounted on the upper end of the stem 4 in a rotatable manner.

Within the lower part of the stem 4 is a tube 11 having its lower end secured to the plate 12 (hereinafter described) and its upper end provided with an outer ring 13, which forms a shoulder or ball race 14.

Within this tube 11 and the tube 4 is a small tube 15 having its upper end secured to the arrow body 5 by the screw 16, and its lower end extending downward below the tube 11, and having attached thereto a circular plate 17.

Said tube 15 is provided with a band 18, the lower edge of which rests upon the balls 19, which are placed in the ball race 14; and near the upper end of said tube 15 are secured lugs 20, which engage the lower wall of the arrow body 5; to prevent said tube 15 from turning with relation to said arrow, as this tube 15 is the means employed by which the arrow 5 is moved into the different positions.

Within the casing 1 is mounted the electrical mechanism for operating the device and the same comprises an upper circular plate 12 of insulating material and a lower plate 21 also of insulating material, secured to the upper plate 12, and spaced therefrom by the posts 22 and 23.

Attached to the lower side of the plate 12 in a parallel and horizontal position are two solenoids 24 and 25; while the ends 26 and 27 of said solenoids 24 and 25 are provided with the transverse screws 28, under the heads of which are secured the forked ends 29 of a yoke arm 30.

Said yoke arm 30 is pivoted to the under side of the plate 12 by the screw 31; and said arm 30 is formed with a bifurcated finger 32, which is adapted to engage a stud 33 secured on the plate 17, for the purpose of moving the same as the yoke arm 30 is moved by the action of the solenoid stems 26 or 27, pulling on either end of the yoke 30, as an electric current is applied to either solenoid.

In Fig. 4 the plate 17 and arm 30 are shown in a central position which will point the arrow directly ahead.

The plate 17 is provided with three locking notches 34, which retain it in any of its three positions; namely, central, right or left, and a latch 35 is provided which is mounted in the bracket 36 secured to the plate 12; and said latch 35, has a depending end 37, provided with a spring 38, for normally holding it in a locked position, and for releasing said latch 35, is provided a magnetic coil 39, which when an electric current is applied thereto, will draw the lower end 37, of said latch against the action of the spring 38, thus raising the latch 35 out of engagement with the notch 34, and allowing the plate 17 and arrow 5 to be swung in either direction by the action of the solenoid.

To bring the arrow back to a central position after being moved either to the right or left, a spring 40 is mounted to the post 23 with its ends bearing against the ends of the solenoid stems 26 and 27; so that as soon as the latch 35 is released the action of said spring 40 will bring the device back to a central position, and the latch 35 will engage the central notch 34 by the action of the spring 38.

To the lower surface of the plate 21 is mounted on the post 41, a bell 42, and a bell ringing magnet 43 of the usual style is mounted on the posts 22 with the bell hammer 44 adjacent to the edge of the bell 42; and suitable wiring and switch is provided for operating said magnet 43.

For automatically ringing said bell 42 when the arrow 5 is moved either to the right or left, a pair of binding posts 45 are secured to the plate 21 and attached to the bell wire circuit.

Said binding posts 45 are provided with resilient contact arms 46, which are placed adjacent to the ends of the spring 40 in such a manner that when either of the solenoid stems 26 or 27 is drawn inwardly, and the other is drawn outwardly the end of the same will press the end of the spring 40 back and make an electric contact with the arm 46, completing the circuit and ringing the bell continuously until released by latch and push button 90.

For operating the light bulbs 9 a single wire system is employed, comprising a wire 47, connecting the two bulbs 9 and a wire 48, having one end attached to said wire 47 and the other end to a member 49 of a slip socket, which is contained in the tube 15; the other socket member 50 of said slip socket having the wire F attached thereto; the object of the slip socket being to prevent the wire becoming twisted as the arrow is moved from side to side.

Referring particularly to Figs. 8, 9, and 10, the electric wiring is as follows.

The wire F from the lights is carried through the plate 21 and attached to the binding screw 60; and a wire N runs from said wire 60 to the binding post 61 on the switch block 62, and a circuit is formed by the switch 63 (Fig. 1.) and a wire O, from post 85.

From the bell magnet 43, the wires G and H pass through the plate 21; the wire G being secured to the terminal 64, which is connected to the terminal 65 by the contact point 67; and the wire H is secured to the screw 68 and to the screw 69 by the wire Q from which a wire I leads to the ground wire 84 and to the battery, and controlled by the push button 70.

From the magnet coil 39, which operates the latch, a wire B is carried to the screw 71 connected to the screw 72 by a wire P, and the wire O leads to the post 85 and to the battery.

From the solenoid 24, the wire A is connected to the screw 72 and the wire C, to the screw 73; from which the wire L leads to the post 74 on the push button 75.

From the solenoid 25, the wire D runs to the screw 72, and the wire E runs to the screw 76, and the wire K to the post 77 of the push button 78.

The posts 45 and arms 46 are connected together by the wire U; and a wire S connects the screws 79, 80, and 81; and a wire M connects the post 82 of the push button 70; the post 83 of said push button 70 being grounded by the wire 84 and to the battery.

A wire 86 connects the posts 87, 88, and 89 of the push buttons 75, 78, and 90, and a wire 91 connects the socket of the push buttons 75, and 78, (see Fig. 9,) and the post 92 of the push button 90.

Referring to Fig. 9, the push button comprises a socket 93 to which the wire 91 is attached; said socket 93 being electrically connected to the contact point 94 and insulated from the binding posts 95 and 96, which have the contacts 97 and 98; one of which is longer than the other, so that when the push button is pressed, two circuits will be made in succession.

In the operation of the device, to light the lights, the switch 63 is used; to ring the bell, the push button 70 is pressed; to turn the arrow and ring the bell, either of the push buttons 75 or 78 are pressed, according to the direction in which it is desired to turn the arrow; and to return the arrow to a normal position and to silence the bell the push button 90 is pressed.

One circuit being completed from the shorter contact 97, to latch magnet, thereby releasing the latch. The other circuit being completed from contact 98 to either solenoid depending on which direction arrow is to be moved. Operation is to release latch first and then actuate the moving member. Reverse operation is accomplished when button 90 is released.

When push button 90 is pressed the action is simply to release the latch.

Having thus described my invention, what I claim as new and desire to secure by Letters Patent, is:—

In a warning and indicating signal for vehicles, the combination with a casing secured to the vehicle and provided with a tubular stem extending upward therefrom and having an indicating means mounted thereon, of a locking disk formed with notches and secured to the lower end of said stem, a latch mounted adjacent thereto and an electric magnet adapted to operate said latch, a pin mounted on said locking disk, a forked arm for engaging said pin for moving said disk, and a pair of electrically operated solenoids for moving said arm.

In testimony whereof I affix my signature in presence of two witnesses.

JOHN M. WITMER.

Witnesses:
H. L. RAUB, Jr.,
E. V. GERHART.